UNITED STATES PATENT OFFICE.

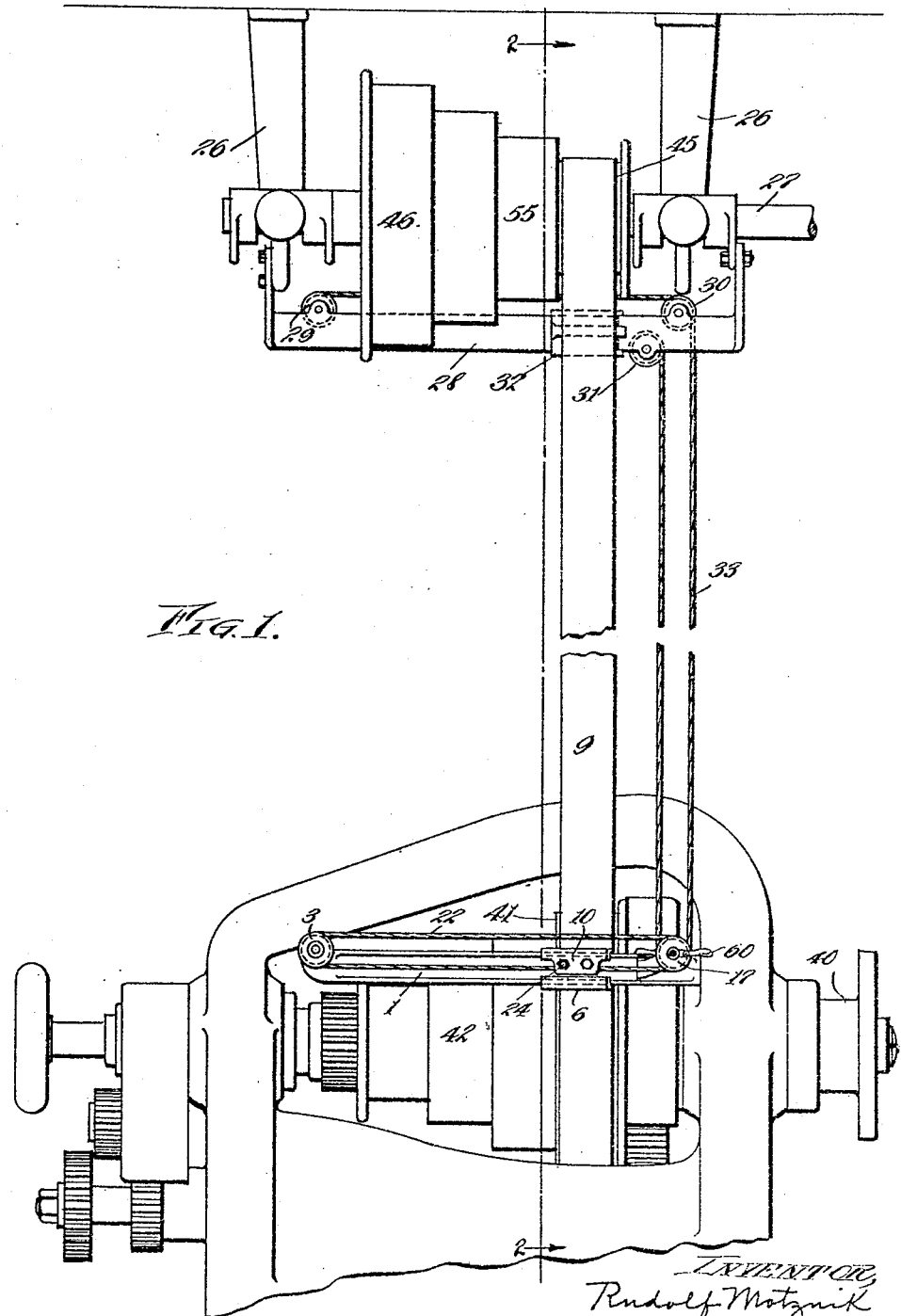

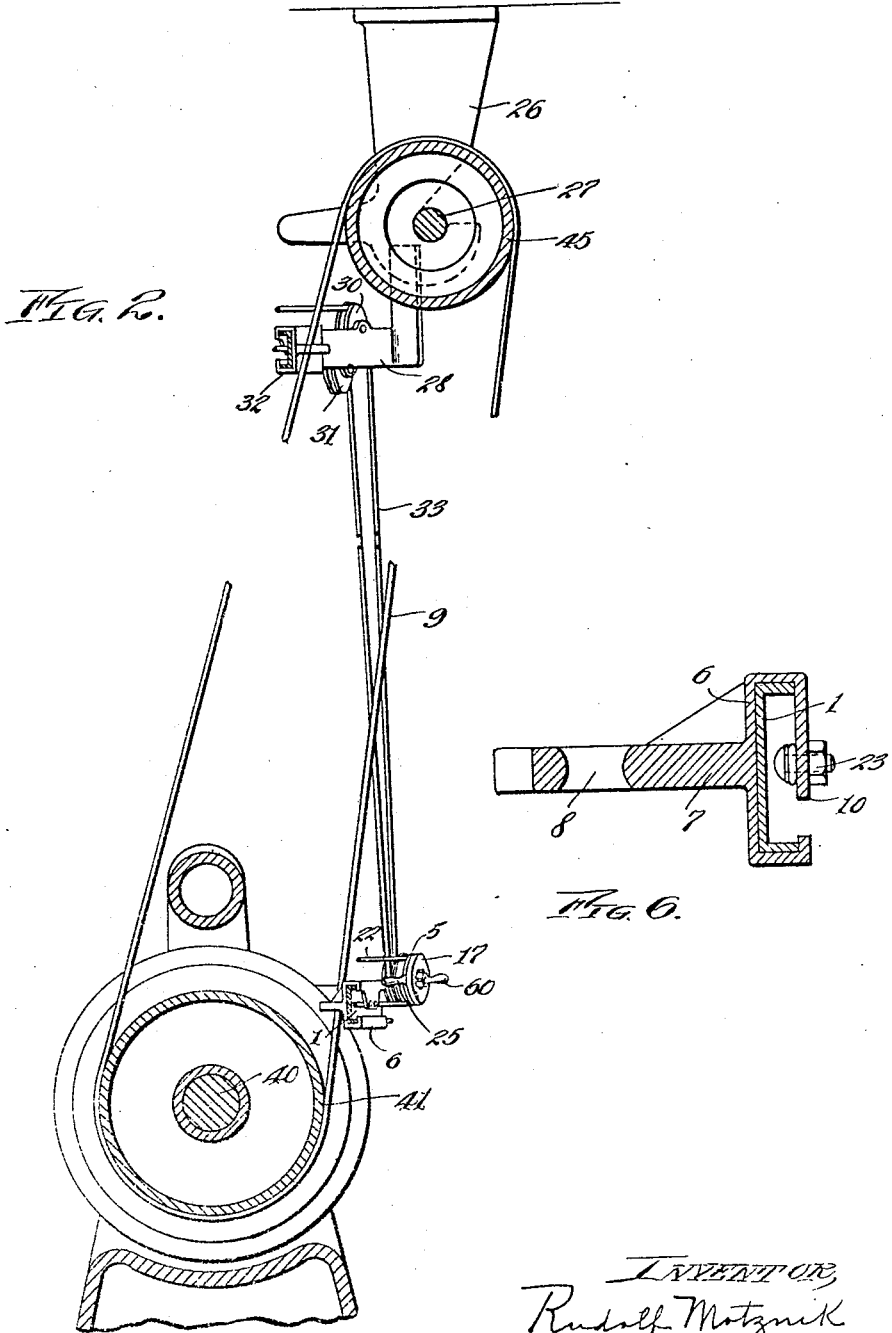

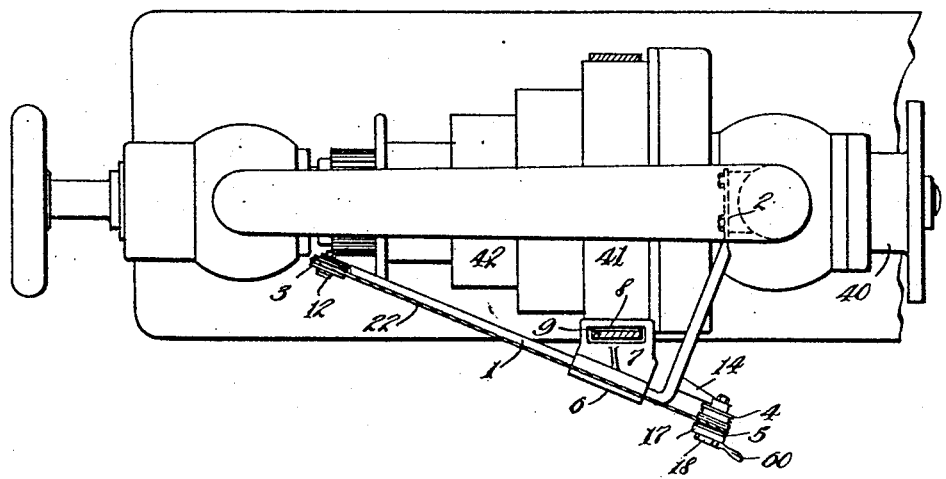
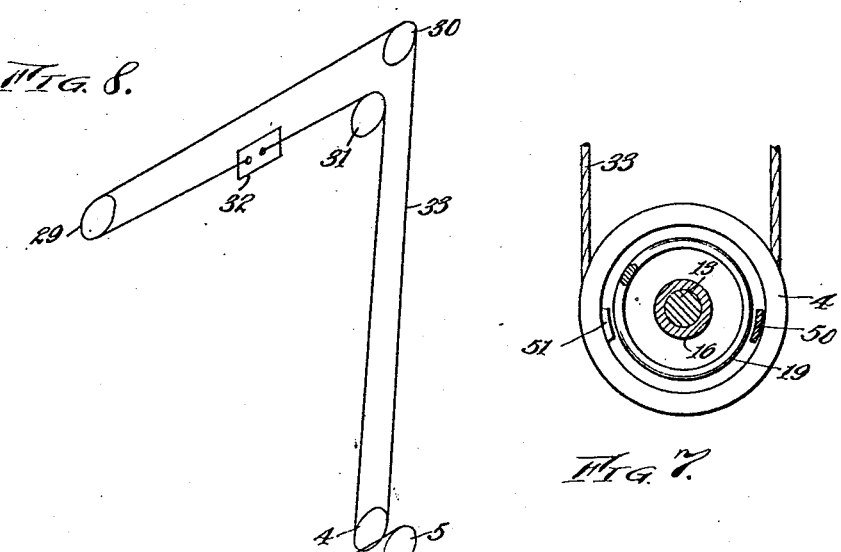
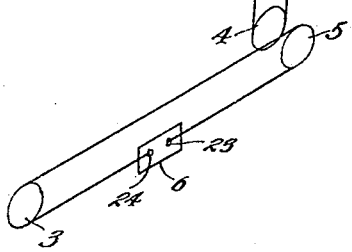

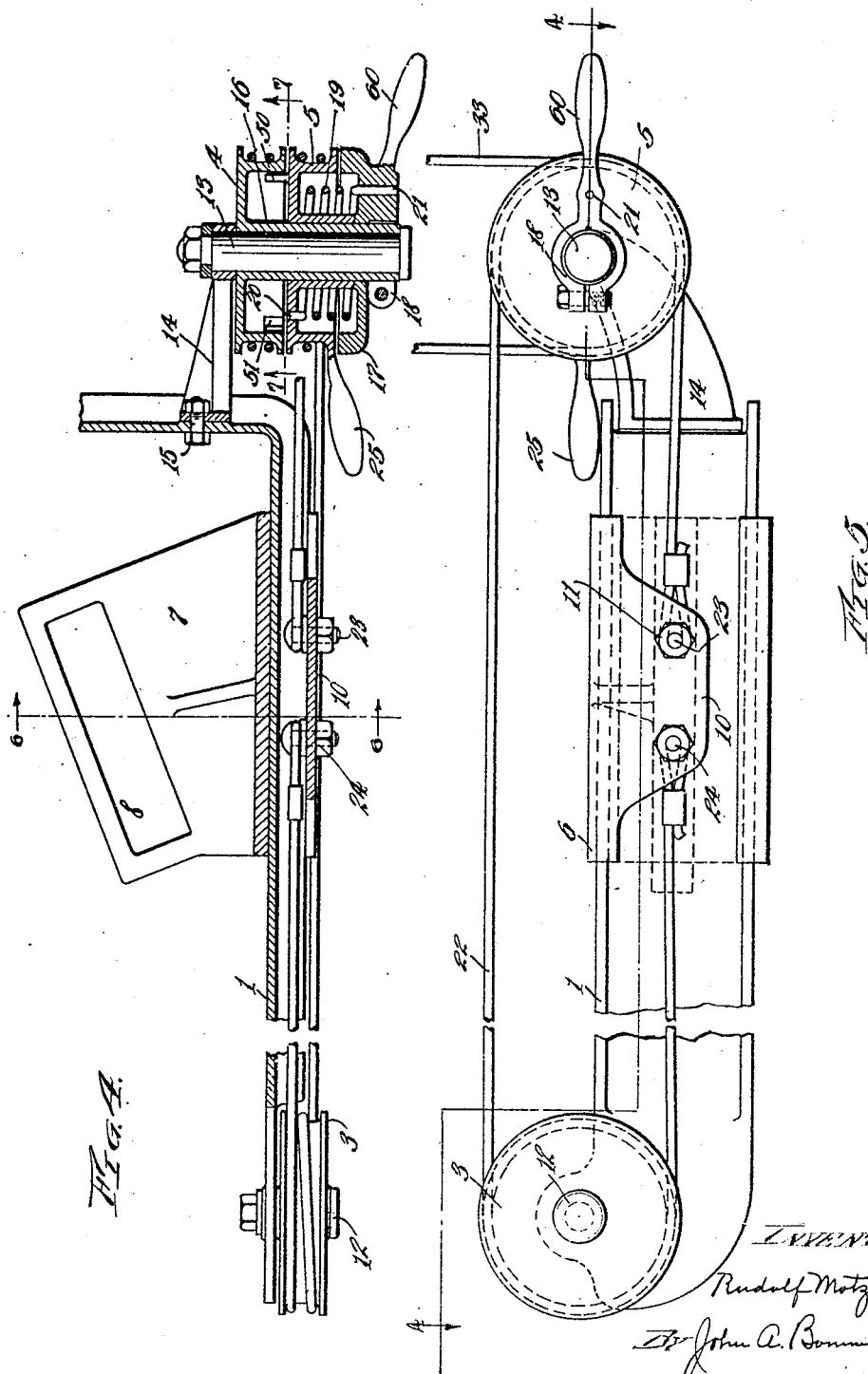

RUDOLF MOTZNIK, OF CUYAHOGA FALLS, OHIO.

AUTOMATIC BELT-SHIFTER.

1,364,574.

Specification of Letters Patent.   Patented Jan. 4, 1921.

Application filed December 22, 1919.  Serial No. 346,635.

*To all whom it may concern:*

Be it known that I, RUDOLF MOTZNIK, a citizen of the United States, residing at Cuyahoga Falls, in the county of Summit and State of Ohio, have invented certain new and useful Improvements in Automatic Belt-Shifters, of which the following is a specification.

This invention relates to a belt shifting device for pulleys and is particularly adapted for use in connection with all types of machines provided with speed reduction pulleys, such as cone and step pulleys.

The particular object of the invention therefore is the provision of a device which will accomplish the shifting of a belt in a quick and efficient manner and one which may be applied to a machine of the type above set forth without necessitating material changes having to be made thereon.

Further and more limited objects of the invention are in the provision of a device which will facilitate the positive and rapid changing of the belt by means of cables instead of shafts, cams, rods and the like, one which will be simple and cheap of manufacture, but owing to its particular construction, efficient and durable in operation.

The invention therefore consists of the certain arrangement and attachment of its component parts hereinafter illustrated in the drawings, described and specifically pointed out in the accompanying description and claims.

Reference being had to the accompanying drawings in which like reference numerals designate similar parts of reference throughout the various views, Figure 1 is a front elevation of the spindle of a lathe, the counter-shaft being shown as secured to the ceiling and my invention being applied thereto; Fig. 2 is a transverse section of the same indicated by the line 2—2 of Fig. 1; Fig. 3 is a plan view of the lathe shown in Fig. 1; Fig. 4 is an enlarged horizontal section through the device the cutting plane being shown at line 4—4 of Fig. 5; Fig. 5 is an enlarged front elevation of the device; Fig. 6 is a sectional detail corresponding to the line 6—6 of Fig. 4; Fig. 7 is a sectional detail on the line 7—7 of Fig. 4 and Fig. 8 is a diagrammatic view showing the method of rigging the cables.

The device as shown consists of a track 1 which is of channel formation and is secured at one end to a lathe as indicated at 2, and the track supports at one end a sheave 3 and at the opposite end a pair of sheaves or drums 4 and 5 about which the cables are passed. Between the sheaves the track has slidably mounted thereon a casting which will hereinafter be termed a belt shifter 6, and said shifter has extending at right angles to it a plate 7 which is provided at one end with an opening 8, said opening being adapted to receive the belt 9. The shifter 6 is also provided with a depending lip 10 to which are secured the ends of one of the cables as by means of bolts 11, for a purpose to be hereinafter described. The sheave 3 is of the ordinary construction and is journaled upon a stud 12 carried by the track 1. The sheave 4 is supported upon a stud shaft 13 rigidly fixed upon a bracket 14 secured to the track 1 by means of bolts 15. This sheave 4 is provided with a sleeved bearing portion or hub 16 which extends the full length of the shaft 13, and said sleeve has rotatably mounted upon it the sheave 5. The sleeve 16 also has mounted upon it at its extreme outer end a cap 17, and said cap is provided with a clamping device 18 whereby the same may be fixed against rotation upon said sleeve. The sheave 5 and cap 17 are connected by a coiled spring 19 fixed to the sheave 5 at 20 and its opposite end to the cap 17 at 21. The cable 22 has one of its ends secured to the lip 10 of the shifter 6 at 23 and then is passed entirely about the sheave 5 and continues over the sheave 3 passing completely about that, and has its other end fixed to the lip 10 at 24. Thus upon rotation of the sheave 5 by the operating handle 25 the casting or belt shifter 6 is caused to move longitudinally of the track 1.

Upon referring to Fig. 1 it will be seen that the bearings 26 of a counter-shaft 27 support a track 28. This track is also channel shaped and has secured to it at one end a sheave 29 and at its opposite end a pair of sheaves 30 and 31. Between the sheaves 29 and 30 the track also has slidably mounted upon it a casting or belt shifting device 32 which is identical in construction with the hereinbefore mentioned shifter 6 and which is for a like purpose. A cable 33 has one of its ends secured to the shifter 32 and from there is led once about the sheave 29, given a quarter turn about the sheave 30 and from there it leads downwardly to the sheave 4, is passed once about the sheave 4 and then upwardly over the sheave 31 and has its opposite end secured to the shifter 32 in a like manner to that before described.

Assuming that the parts are in the position shown in Figs. 1 and 5 of the drawings and that it is desired to increase the speed of the spindle 40 of the lathe the belt 9 must first be removed from its engagement with the step 41 of the pulley 42. By rotating the sheave 5 in a clockwise direction, the belt shifter 6 is caused to move to the left or in a direction to remove the belt from the step 41. Being free to rotate upon the hub 16, the sheave 5 causes no initial movement of the sheave 4 at this time, but through an increasing tension of the spring 19 and its connection, the cap 17, with the sheave 4 is caused to turn and this draws the cable 33 and causes the shifter 32 to exert an ever increasing force upon the upper part of the belt sufficient to cause it to bear to the left upon the portion 45 of the pulley 46. Just prior to the time when the belt is about to leave the surface 41 a lug 50 made integral with the sheave 5 engages a projection 51 upon the sheave 4 and thereupon imparts a positive driving movement to said sheave. By this movement the tension of the spring is so controlled as to cause the shifter 32 to move with a snap over to the left or in a position to carry the belt upon the surface 55 of the pulley 46. The tension of the spring 19 is then such as to keep the cables 22 and 33 in a relatively fixed position to retain the corresponding shifters 6 and 32 in the proper position. When it is desired to reverse the operation or to move the belt to the right the action is similar, but in this instance the operating handle 60 of the cap 17 is caused to rotate said cap in an anti-clockwise direction and it will be seen that the initial movement is then imparted upon the sheave 4 in a direction to move the shifter 32 properly and as before an ever increasing tension is exerted by the spring 19 to the sheave 5 which will cause that to move in the proper direction in due course, after the lost motion permitted by the spring is taken up.

While I have shown an open belt as a means of connecting the spindle of the lathe with the counter-shaft it is obvious that a device of this kind could be applied with equally efficient results upon a crossed belt, it being understood that the points of engagement of the shifters 6 and 32 with the belt would be adjacent to the points where the belt runs over the pulleys, and I do not wish to limit myself in the position or construction of the certain parts further than is required by the state of the art or that which comes within the scope of the appended claims.

I claim:

1. A belt shifter comprising a pair of sliding belt engaging members, cables connected to said members respectively, a pair of sheaves around which the cables respectively pass, and a spring connection between the sheaves, whereby when one is turned the motion is yieldingly communicated to the other.

2. A belt shifter comprising a pair of belt engaging members movable laterally to shift opposite ends of the belt, cables connected to said members respectively, a pair of concentric sheaves around which the cables respectively pass, and a lost-motion connection between the sheaves, adapted to turn either sheave after the other is turned, said connection comprising a lug on one sheave and a projection on the other sheave adapted to strike said lug.

3. A belt shifter comprising a pair of belt engaging members movable laterally to shift opposite ends of the belt, cables connected to said members respectively, a pair of sheaves around one of which each of the cables passes, a spring connection between the sheaves, whereby when one is turned tension is placed on the other, and a positive connection between the sheaves engageable when the spring is under a certain tension, to positively turn one sheave after the other is turned to a certain extent.

4. A belt shifter comprising a pair of belt engaging members movable laterally to shift opposite ends of the belt, cables connected to said members respectively, a pair of concentric sheaves around which the cables respectively pass, each of said sheaves being provided with means whereby it may be turned, and a spring connection between the sheaves, whereby when one is turned the other follows.

In testimony whereof, I do affix my signature in presence of two witnesses.

RUDOLF MOTZNIK.

Witnesses:
E. A. WILD,
H. O. VAIL.